(12) United States Patent
Anand et al.

(10) Patent No.: US 9,031,963 B2
(45) Date of Patent: *May 12, 2015

(54) METHOD OF INTERACTIVE VIDEO BLOGGING

(71) Applicant: Samsung Electronics Co., Ltd., Gyeonggi-do (KR)

(72) Inventors: Bela Anand, Bangalore (IN); Girish Kulkarni, Bangalore (IN)

(73) Assignee: Samsung Electronics Co., Ltd (KR)

( * ) Notice: Subject to any disclaimer, the term of this patent is extended or adjusted under 35 U.S.C. 154(b) by 166 days.

This patent is subject to a terminal disclaimer.

(21) Appl. No.: 13/949,930

(22) Filed: Jul. 24, 2013

(65) Prior Publication Data

US 2013/0311586 A1 Nov. 21, 2013

Related U.S. Application Data

(63) Continuation of application No. 12/017,816, filed on Jan. 22, 2008, now Pat. No. 8,515,978.

(30) Foreign Application Priority Data

Jan. 19, 2007 (IN) .............................. 118/CHE/2007

(51) Int. Cl.
| | | |
|---|---|---|
| *G06F 7/00* | (2006.01) | |
| *G06F 17/30* | (2006.01) | |
| *H04L 12/58* | (2006.01) | |

(52) U.S. Cl.
CPC .......... *H04L 51/32* (2013.01); *G06F 17/30038* (2013.01); *G06F 17/3089* (2013.01)

(58) Field of Classification Search
USPC ................................................ 707/104.1, 10
See application file for complete search history.

(56) References Cited

U.S. PATENT DOCUMENTS

| | | | |
|---|---|---|---|
| 2004/0071263 | A1 | 4/2004 | Motoki |
| 2006/0184610 | A1* | 8/2006 | Izdepski et al. ............... 709/203 |
| 2006/0218181 | A1 | 9/2006 | Jeon |

(Continued)

FOREIGN PATENT DOCUMENTS

| | | |
|---|---|---|
| JP | 2004-073462 | 3/2004 |
| JP | 2004-350092 | 12/2004 |
| JP | 2005-267171 | 9/2005 |

(Continued)

OTHER PUBLICATIONS

Korean Office Action dated Jan. 5, 2015 issued in counterpart application No. 10-2008-0005892.

*Primary Examiner* — Kuen Lu

(74) *Attorney, Agent, or Firm* — The Farrell Law Firm, P.C.

(57) ABSTRACT

A method and apparatus are provided for interactive video blogging. The method includes receiving, by a server, a comment attached to a video blog file from a first terminal, the comment being associated with a point of time at which the comment is displayed along with the video blog file; converting, by the server, the comment into a descriptor file; storing, by the server, the descriptor file; receiving, by the server, information on a selected one of a plurality of descriptor files stored in the server from a second terminal, the plurality of descriptor files representing a plurality of comments attached to the video blog file; and transmitting, by the server, the selected one of the plurality of descriptor files to the second terminal.

24 Claims, 4 Drawing Sheets

(56) References Cited

U.S. PATENT DOCUMENTS

2007/0067104 A1* 3/2007 Mays ........................... 701/211
2008/0033735 A1* 2/2008 Graham et al. .................. 705/1

FOREIGN PATENT DOCUMENTS

| KR | 1020060102683 | 9/2006 |
| WO | WO2004102855 | 11/2004 |

* cited by examiner

METHOD OF INTERACTIVE VIDEO BLOGGING

PRIORITY

This application is a Continuation of U.S. application Ser. No. 12/017,816, which was filed in the U.S. Patent and Trademark Office on Jan. 22, 2008, and claims priority under 35 U.S.C. §119 to Indian Patent Application Serial No. 118/CHE/2007, which was filed in the Indian Intellectual Property Office on Jan. 19, 2007, the content of each of which is incorporated herein by reference.

BACKGROUND OF THE INVENTION

1. Field of the Invention

The present invention in general relates to the field of multimedia applications. The present invention involves the use of mobile phones with camera functionality, including mobile phones, smart phones, etc.; handheld devices with a camera, desktop applications, network connectivity, etc.; and desktop devices, such as a Personal Computer (PC). More particularly, this invention relates to a method of interactive video blogging.

2. Description of the Related Art

Patent publication number (WO/2004/102855), titled "Content Publishing Over Mobile Networks" discloses a system for using mobile phones to generate instant messages and permanent text publishing, images and audio files as mobile web logs (hereinafter, "mBlogs") over mobile networks. The system allows a user to generate and publish text, and attach image files and audio files with a time and location of an event as a non-revocable and integral part of the published content. Users are allowed to view and interact with the published content with mobile phones over mobile networks. The system allows for sorting of content by category and by indexing the material by the operator of a mobile network, and allows the users of mBlogs to search for content by category as well as by indexing. Furthermore, the system allows users to subscribe to mBlogs as multimedia messages for viewing on mobile phones over mobile networks.

The current approach allows users to create web logs (hereinafter, "blogs") from mobile devices and/or PCs with still images & text. Other users can also participate in blogging by adding text comments or still images. Blogging does not allow adding information in the form of audio-video as a blog or adding audio video comments or a combination of text, audio, and video comment from mobile devices and/or PCs.

The current approach to video blogging is inefficient & does not allow a user to express his/her views in interactive ways as video blogs lack methods to co-relate user comments and original content.

Entering text as a comment is difficult & cumbersome, particularly if a user is using a handheld device like a mobile phone. The process of entering text as a comment consumes a lot of a user's time. It is difficult to associate text comments with specific portion of video blog. Allowing users to insert audio/video comments in adds more value and meaning, which is not possible with the current approach.

The information or comments added by other users in a video blog are just sequentially listed, and there is no mechanism currently available to co-relate user comments and a specific portion of the original video blog. A user may wish to add his/her audio, video or text comment with respect to specific point in an original video, while watching the original video. But currently, there is no available method that allows users to create audio, video or text comments with respect to a specific portion of the video or inserting comment at specific time while watching.

Original blog & comments added by other participants are inseparable. All comments are placed sequentially and every comment or information added by any user becomes an integral part of the blog, which increases the size of the blog, depending on the number of participating users and the information added by each user.

Users have no ability to see the comments added by various users with respect to specific portions or instant moments of the original blog. The user cannot see the added comments interleaved with the original blog with respect to time and content, keeping the original blog and comments as separate entities.

Users must download/stream a complete blog having original content and comments added by all users every time the user wants to watch or participate in the blog.

As a video blog size grows depending on the number of participating user and the content added by the users, users who participate late feel a burden of uploading and downloading/streaming the video blog. The downloads and streams overload the server and network, and consume user time and money.

A user has no option of selecting specific comments of his/her interest made on his/her favorite video blog. The user must download/stream and watch complete blog in order to see who has commented on the blog. He needs to download/stream and watch the complete blog in order to see just one comment added by a friend.

A user has no option to select particular comments and watch/play the selected particular comments directly.

Currently there is no mechanism or method available that allows a user to insert a comment (text, audio, or audio-video) on an original blog and upload only the inserted comment. The user must upload the original blog, all previous comments, and the new comment inserted by the user.

Currently there is no mechanism or method available that allows a user to insert comments (text, audio, audio-video) on original blog instantaneously and upload only comments associated with a specific portion or a specific instant of the original video blog.

Currently there is no mechanism or method available, which allows a user to see an original blog and all comments (text, audio, or audio-video) inserted separately by various users (each comment is a separate entity).

Currently there is no mechanism or method available that allows a user to view an original blog and all comments (text, audio, audio-video) on the original blog separately associated with a specific portion, or a specific instant of the original video blog.

Currently there is no mechanism or method available that allows a user to see original blog and all comments (text, audio, or audio-video) on the original blog, add a comment to a comment (a comment of one user associated with another user's comment) separately associated with a specific portion or a specific instant of the original video blog, or add a comment to the original video blog.

Currently there is no method that allows a user to see original blog and each comment (text, audio, or audio-video) added by other users as a separate entity and therefore cannot download/stream the original blog along with comments of the user's choice.

A user may wish to insert a comment (text, audio, or audio-video) at a specific time while watching original blog and may want other users to see his inserted comment played at the same time while watching the video blog. The insertion of a comment while watching a blog by one user and playback of the original blog along with the inserted comment at the same time is not supported by current systems.

A user may wish to insert multiple comments in various forms (text, audio, or audio-video) at different points of time while watching an original blog and may want other users to see his inserted comments played at the same time while watching the video blog. The insertion of comments in various forms while watching the blog by one user at various points of time and playback of the original blog along with inserted comments at the same time is not supported by current systems.

A User may have a video blog along with comments made by various users in various forms like text, audio, video, but the user has no option of selecting comments by category (e.g., text, audio, audio-video etc.).

A user has no mechanism to play the comments added by a user's selection of friends. The user has no mechanism to randomly select the comments the user wishes to see.

A user may have a video blog along with comments made by various users in various forms like text, audio, video, but the user cannot select a particular comment and directly play/watch the comment.

A user may have a video blog along with comments made by various users in various forms like text, audio, video, but the user cannot select a particular comment and directly play/watch the comment along with an associated video or a specific portion of the video, etc.

The present invention addresses these needs.

SUMMARY OF THE INVENTION

The present invention relates to a method for video weblogging (blogging) application that enhances the blogging from just image and text to audio-video and text content along with Interactive blogging In accordance with an aspect of the present invention, a method for interactive video blogging is provided. The includes receiving, by a server, a comment attached to a video blog file from a first terminal, the comment being associated with a point of time at which the comment is displayed along with the video blog file; converting, by the server, the comment into a descriptor file; storing, by the server, the descriptor file; receiving, by the server, information on a selected one of a plurality of descriptor files stored in the server from a second terminal, the plurality of descriptor files representing a plurality of comments attached to the video blog file; and transmitting, by the server, the selected one of the plurality of descriptor files to the second terminal.

In accordance with another aspect of the present invention, a server for interactive video blogging is provided. The server includes a memory; and a controller that receives a comment attached to a video blog file from a first terminal, the comment being associated with a point of time at which the comment is displayed along with the video blog file, converts the comment into a descriptor file, stores the descriptor file in the memory, receives information on a selected one of a plurality of descriptor files stored in the memory from a second terminal, the plurality of descriptor files representing a plurality of comments attached to the video blog file, and transmits the selected one of the plurality of descriptor files to the second terminal.

In accordance with another aspect of the present invention, a method for interactive video blogging is provided. The method includes displaying, by a terminal, a video blog file; receiving, by the terminal, a comment attached to the video blog file from a user of the terminal, the comment being associated with a point of time at which the comment is displayed along with the video blog file; transmitting, by the terminal, the comment to a server; transmitting, by the terminal, information on a selected one of a plurality of descriptor files stored in the server to the server, the plurality of descriptor files representing a plurality of comments attached to the video blog file; and receiving, by the terminal, the selected one of the plurality of descriptor files from the server.

In accordance with another aspect of the present invention, a terminal for interactive video blogging is provided. The terminal includes a memory; a display that displays a video blog file; and a controller that receives a comment attached to the video blog file from a user of the terminal, the comment being associated with a point of time at which the comment is displayed along with the video blog file, transmits the comment to a server, transmits information on a selected one of a plurality of descriptor files stored in the server to the server, the plurality of descriptor files representing a plurality of comments attached to the video blog file, and receives the selected one of the plurality of descriptor files from the server.

BRIEF DESCRIPTION OF THE DRAWINGS

These above and other aspects, features, and advantages of the present invention will become more apparent from the following detailed description when taken in conjunction with the accompanying drawings, in which.

DETAILED DESCRIPTION OF EMBODIMENTS OF THE INVENTION

Figure 1:
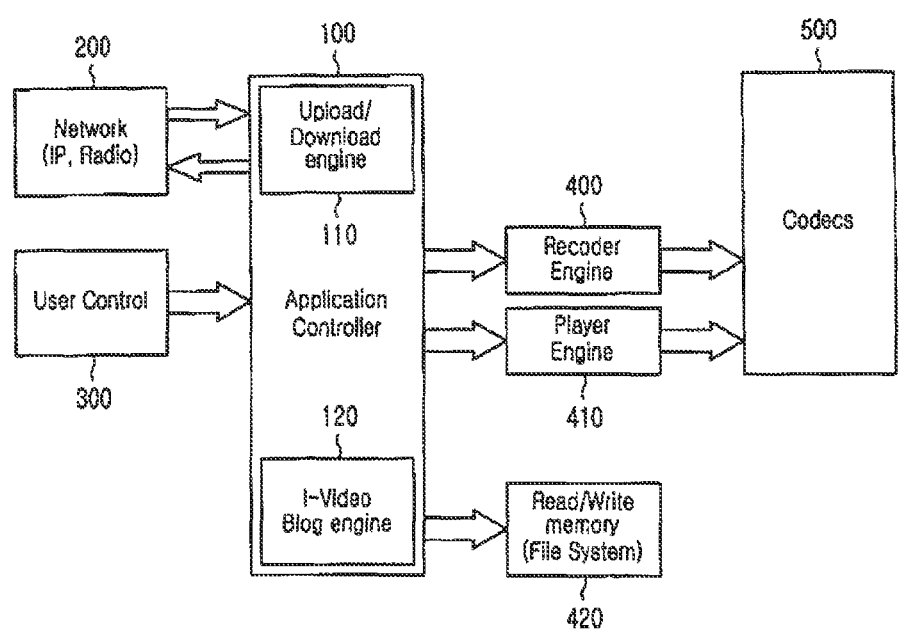
FIG. 1 is a block diagram illustrating components of a video blogging apparatus according to an embodiment of the present invention.

Various embodiments according to the present invention will be described with reference to the accompanying drawings. In the following description of the embodiments of the present invention, a detailed description of known functions and configurations incorporated herein will be omitted when it may obscure the subject matter of the present invention.

The present invention is a new method for video weblogging (blogging) application that enhances the blogging from just image and text content to audio-video and text content along with "Interactive AV blogging." A user can create a video blog using a device having a camera and recording functionality. The user can also use an existing or pre-recorded file as a video blog.

A user can upload a video blog to a server or a video blogging site using conventional methods such as an e-mail attachment, File Transfer Protocol (FTP) or a method recommended by a service provider or the video blogging site. The method provided herein assumes that some means are available to the user to upload a video blog to a server/video blog site using a device available to the user, such as a mobile phone, a smart phone, a Personal Computer (PC) or any such handheld device. Once uploaded, accessing the same video blog by the owner or other users depends on terms and conditions offered by a host server/video blog site or a service provider. The example method provided herein assumes that there are some means available to access an uploaded video blog, either by an owner, some users or a group of people that are granted limited access by the owner, video blog sites the service provider, or anybody (global access). The owner of the video blog may share the blog to some people by entering the other users' mobile numbers or user Identifications (IDs) and may invite the users to watch and participate in the video blog. The invited people might get some notification of the invitation through e-mail, Short Message Service (SMS) or Multimedia Message Service (MMS). If a video blog is shared by all users for access, then a notification is not necessary and anybody can access uploaded video. People with access can watch the video blog online using web player. If any user wants to add a comment on the video blog the user must download the blog or have a streaming client (a player that can play data streamed by the server). The method provided herein assumes that some means are available to the user to download/stream the video blog from the server, video blog site using the device available with the user such as a mobile phone, a smart phone, a PC, or any handheld device.

With the existing methods a user can add only text comments. But the present invention, "Interactive Video Blogging" (I-VB) enables a user to insert a comment in a form of text, audio, or audio video, at any point of time, while playing a video blog. The user selects a video blog of choice, downloaded by the user, or selects a video blog to be streamed from a server and starts playing a video file.

The application shows two windows on an LCD—one playing a video blog (W1) and another is empty (W2). Whenever the user wants to insert the comment in the video blog the user should select an "Insert" option. Whenever the user selects the insert option, an application pauses playback of the video blog playing in one window (W1). The user must select a comment type (e.g., text, audio or Audio-video). If the user selects a "text" option then the other window (W2) shows a text editor and allows the user to input text characters to add a text comment. If the user selects an "Audio" option, then the application allows the user to record his comment as audio clip. If a user selects an "Audio-Video" option then, the other window (W2) shows a camera preview and the user can record audio-video comment. The user can resume playback of a video blog from the same position in window W1 by using an option "resume" after recording his comment. The user can repeat the above procedure of "insert" and "resume" while watching the video blog to insert comments in the form of text, audio or audio-video at various points of time.

The inserted comment does not affect the original video blog. The inserted comment becomes a separate descriptor file. Depending on the option selected by the user each insertion becomes a separate descriptor file or all insertions during a session can be merged into one descriptor file.

The descriptor file has two major parts (i.e., data and metadata). The purpose of metadata in the descriptor file is to allow the user to define the type of comment (text, audio or audio-video) and remember/record the information such as for which file (downloaded/streamed video blog or for a comment on video blog) the comment is inserted, details of the video blog like date/time, at which point of time the comment is inserted while playing, video frame number, audio frame number of the video blog, time of insertion and offset. This information helps to co-relate or associate the descriptor file with the correct video blog or comment on the video blog, and provides the information about the exact location of where the comment is inserted. Along with the above information, the descriptor stores the data (text, audio, video) inserted by the user in a compressed/encoded form.

The above information enables an application to find the relation between the descriptor file and the associated video blog. The above information also provides perfect information concerning when a particular comment in a descriptor file is inserted and a type of comment. Using the above information, it is possible to play original video blog along with the comments inserted at various point of time at correct time if original blog & descriptor file is available.

In descriptor file the text information is stored in American Standard of Code for Information Interchange (ASCII) form whereas, audio and video information is stored in the format used in original video blog. For example, if original blog is recorded in the H.263 Video and Advanced Audio Coding (AAC) format, then an inserted Audio-Visual (AV) comment is also stored in the H.263 & AAC format. In order to support this functionality, the application checks the codec type of video blog & initializes the same for inserting audio-video comments at the beginning.

The present invention provides two formats of the descriptor file; one format is proprietary (new/non-standard) and the other format is the $3^{rd}$ Generation Platform (3gp)/Motion Picture Experts Group (MPEG-4 (mp4)) format. In case of the 3gp/mp4 format, any audio or audio-video comment inserted by the user is recorded as per the 3gp/mp4 specification. But all other information like metadata and text comment is written as user defined atom. Therefore, the descriptor file created by application can be played in any 3gp/mp4 compliant player. But as complete metadata is in the user-defined atom of the 3gp/mp4 descriptor file, all players other than I-VB application can not co-relate descriptor file with its associated video blog and can not play comments at right time.

The present invention also provides a proprietary method of writing metadata and data as a descriptor file. In this case I-VB records metadata and data required to associate a descriptor file with a specific video blog along with the timing information. The disadvantage of this method is that only the I-VB application can play and co-relate descriptor file with its associated video blog and can play comments at the right time. There are two ways in which the user can insert comments. The user can download the blog and can play the blog in the I-VB application for inserting comments or can insert comments while playing a streamed blog in the I-VB application. Thus after downloading a video blog or while streaming the original blog, the user can play the video blog in the I-VB application and can insert comments in the form of a text, audio, or audio-video file. The inserted comment does not become part of original blog. The above method enables the user to participate in video blogging by inserting comments in the form of text, audio, and audio-video instantaneously at a suitable location while watching the original blog in real-time without modifying the video blog. The comments inserted by the user become a separate descriptor file. The user only needs to upload the descriptor file and does not upload the video blog. Multiple users can simultaneously download/stream the blog and can participate in video blogging by creating descriptors files and then uploading only descriptor files to server without uploading the video blog. If there are already such descriptor files created and uploaded by some users, then a new user can see the original blog and various separate descriptor files on the server. The server shows a listing of the original blog, comments added, and comments to comments added by the users as descriptor files. It is possible to play the original video blog and selected descriptor files online or through a web-player if the server runs the I-VB application. But the user can only watch the video blog and inserted comments with respect to time and cannot insert any comments through the web-player.

A new user can select descriptor files of choice and can download the descriptor files along with the original blog. The new user opens the original blog along with the descriptor file/files of choice. If the user selects a play option, then the application starts playing the original blog. The application shows two windows on a Liquid Crystal Display (LCD), i.e., W1 and W2 and play the original blog in W1. The application checks the metadata in various descriptor files and keeps the track of types of comment and when the comments were inserted in the original blog. Based on information available whenever the application finds any comment to be played at a particular instant, the application pauses the playback of the original video blog in W1 and starts playing the comment in W2. If the comment is text, then the application shows text comment in W2. For audio, the application plays audio comments, whereas for audio-video comments, the application plays comment in W2. The application resumes playback when user selects resume or when the comment ends. Using the above method, it is possible to see/watch all of the comments inserted at various points of time during a playback of the original video.

The application also provides quick and easy access to the comments inserted in the blog and directly goes to the selected comment and the comment's associated video point in the original video blog. The user can select the original blog along with descriptor files of the user's choice and then types of comments like text, audio, or audio-video. The application provides a listing of all text or audio or audio-video comments along with a video thumbnail, which is a starting point of the associated video in video blog. The user can select a comment and can directly jump to that comment and the comment's associated video. The same user, if interested, can insert a new comment after watching other comments and can upload the new comment to the server.

The application also allows the user to convert a descriptor file to a new video blog. In this case, the application deletes all references to the original video blog. The owner of the video blog can update the original video blog by merging some or all descriptor files to the original video blog and can upload again. For example, the user can merge three descriptor files with original blog out of six files available on server. The user must delete descriptor files merged with original file and must update remaining to upload on to the server. The application also provides an option of playing all comments back-to back.

It is also possible to play/stream a few or all of the comments selected by user with respect to the time along with the original blog at server, if the server uses the I-V blog application.

A user can watch the original blog along with the comments inserted by other users, i.e., comments inserted with respect to the content/time of insertion, using a streaming player as server streams down the data using the technique described above to play the original blog and comments using I-VB application.

Figure 4:
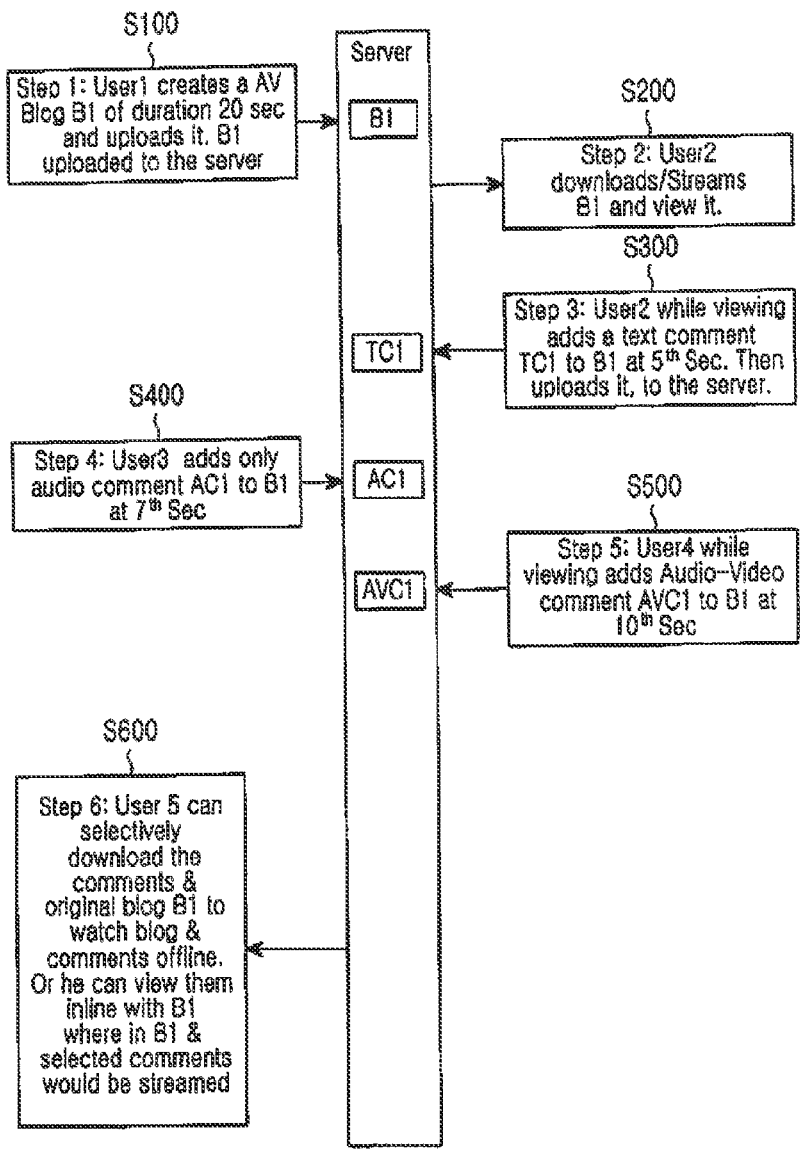
FIG. 4 is a diagram illustrating a method for real-time video blogging according to an embodiment of the present invention.

Referring to FIG. 4, the following scenario is explained to describe an exemplary embodiment of the present invention:

Step 1: User 1 creates an Audio-Video (AV) Blog B1 with a duration of 20 seconds and uploads the AV Blog B1 to the server.

Implementation: The AV Blog B1 can be any User-Created Content (UCC) that User 1 wants to publish.

Step 2: User2 downloads/streams AV Blog B1 and views the downloaded blog.

Implementation: AV Blog B1 can be downloaded/streamed using an IVB player. B1 is a 3gp file and can be played in any compliant player. However, the IVB player will also allow the viewer to instantaneously add comments while playing the AV Blog B1.

Step 3: While viewing AV Blog B1, User 2 adds a text comment TC1 to B1 at the five-second time point, and then uploads the text comment TC1 to the server.

Implementation: The comment addition is possible when the User2 viewing B1 in the IVB player, wishes to insert a comment and then presses an "insert" button. When the insert button is pressed, two things happen:

First, the User2 is prompted with a choice of comment User2 wishes to add, i.e. text, audio, or audio-video. Based on the selected type, the other information is derived as below.

The time at which insert button is pressed is noted. Based on this time and the above chosen type of comment, the information is stored.

Text: The timestamp is stored at time point 5000 ms; the video frame with respect to this time is determined and is stored in a user-defined atom in Meta data of the descriptor file. The text track is stored as per the 3gp file format specification.

Step 4: User3 adds only Audio Comment AC1 to B1 at the 7th second of B1.

Implementation:

Audio: The timestamp is stored at time point 7000 ms; the audio frame with respect to this time is determined and is stored in a user-defined atom in Meta data of the descriptor file. The audio track is stored as per the 3gp file format specification.

Step 5: While viewing B1, User4 adds Audio-Video comment AVC1 to B1 at the 10th second of B1.

Implementation:

Audio-Video: The timestamp is stored at time point 10000 ms; the nearest video I-frame with respect to this time is determined and is stored in a user-defined atom in Meta data of the descriptor file. The audio-video tracks are stored as per the 3gp file format specification.

Along with the timestamp and frame number information, associative information, like a creator's name, a parent blog, a creation date and time etc., is also stored.

Step 6: User 5 can selectively download the comments and original blog B1 to watch the blog B1 and the comments offline. Or User 5 can view the comments inline with blog B1, wherein B1 and the selected comments would be streamed.

Implementation: Step 6 can be broken into two parts and individually explained as below:

Selectively Download Comments: This implies that User 5 would be given a choice to select the category of comments User 5 wishes to view. The categories can be: type of comment, author of the comment, date and time of the comment, comments associated with a portion of the blog, etc. When User 5 selects a category, all the comments that belong to that category will be displayed; User 5 can select either all or any of the displayed comments.

View the comments inline where B1 can either be streamed or downloaded: User 5 can either download comments and the original blog to watch the blog offline or can watch using a streaming player. The technique used for local playback and for streamed playback is the same as the technique for playing comments with respect to time in the original blog. This technique is implemented using the information stored in the descriptor file, while addition of comments is performed as described above. The frame number and timing information is used to stop playing/streaming of the blog B1 and start playing/streaming the comment at the appropriate frame number of the blog B1.

Text Comment Playback: The frame number after which this comment is to be played is stored in the user-defined data of the meta data in the descriptor file.

Audio Comment Playback: The frame number after which this comment is to be played is stored in the user-defined data of the meta data in the descriptor file.

Audio Video Comment Playback: The frame number after which this comment is to be played is stored in the user-defined data of the meta data in the descriptor file.

Requirements to implement the invention:

A mobile terminal or an embedded device or any handheld device or PC with camera functionality;

Software/hardware to encode camera frames to the format specified by user;

Software/hardware to decode frames from the file;

A CPU to control and meet the real time constraints of the application;

A display device, with audio capture, and real-time playback capabilities;

A media file reader and writer for the format specified by the user;

A storage device or memory with read/write capability;

Software/hardware to upload/download a video blog to a server; and

Software/hardware to play streamed data from the server (streaming playback).

The block diagram of FIG. 1 demonstrates the system more concretely. As shown in FIG. 1, the system basically comprises an Application Controller 100 including an Upload/Download Engine 110 and an I-Video Blog Engine 120, a User Control 300, a Recorder Engine 400, a Player Engine 410, a Read/Write Memory 140, and a Codec 500.

A CPU corresponds to the Application Controller 100, software/hardware to upload/download a video blog corresponds to the Upload/Download Engine 110, and the software/hardware to play corresponds to the I-Video Blog engine 120. The peripheral devices are not shown in FIG. 1.

Figure 2:
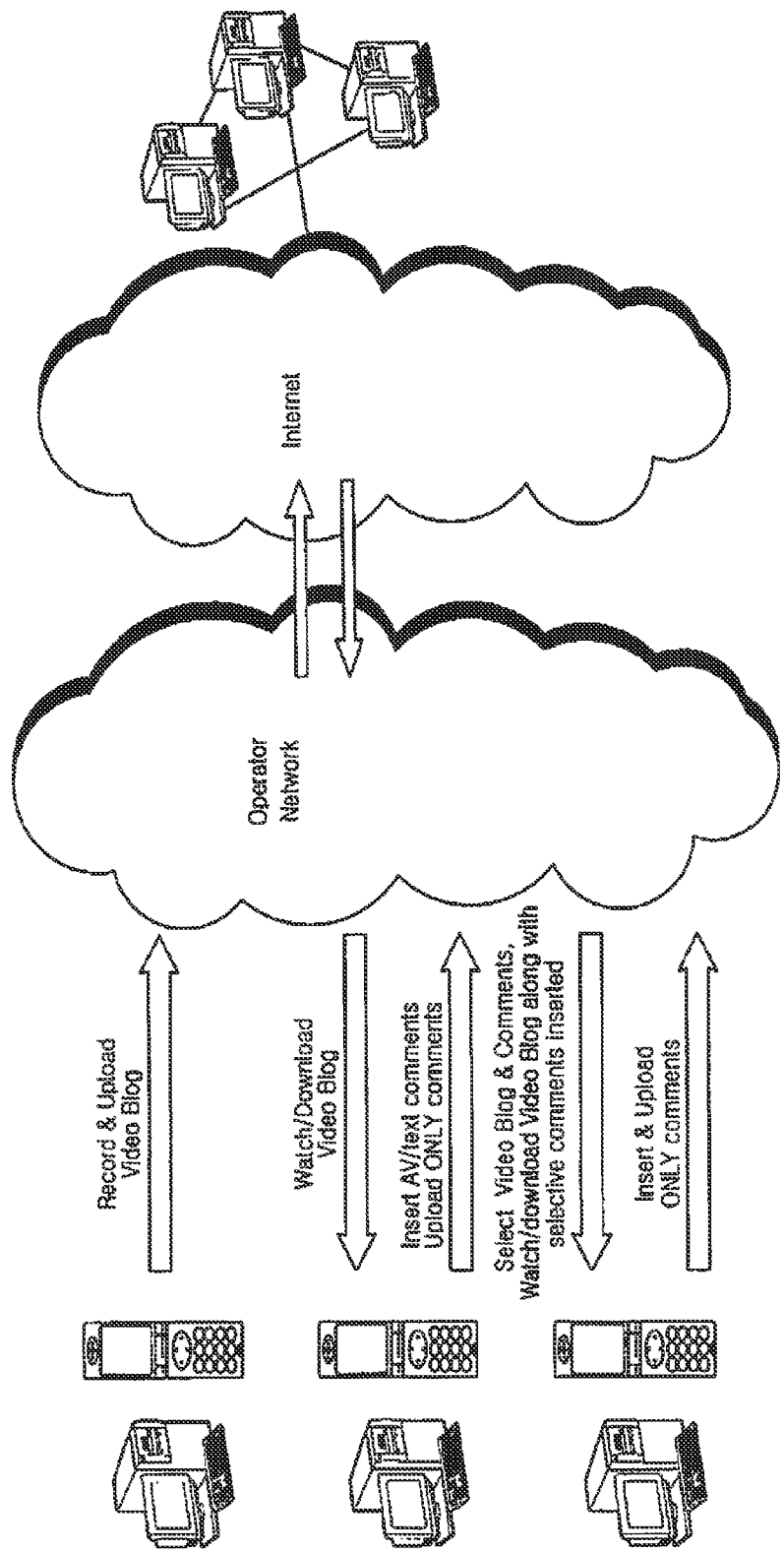
FIG. 2 is a diagram illustrating a system for viewing and adding comments to a video blog according to an embodiment of the present invention

Referring to FIG. 2, a system for viewing and adding comments to a video blog according to an exemplary embodiment of the present invention is illustrated. The diagram also illustrates the selection of the Video Blog and Comments.

Figure 3:
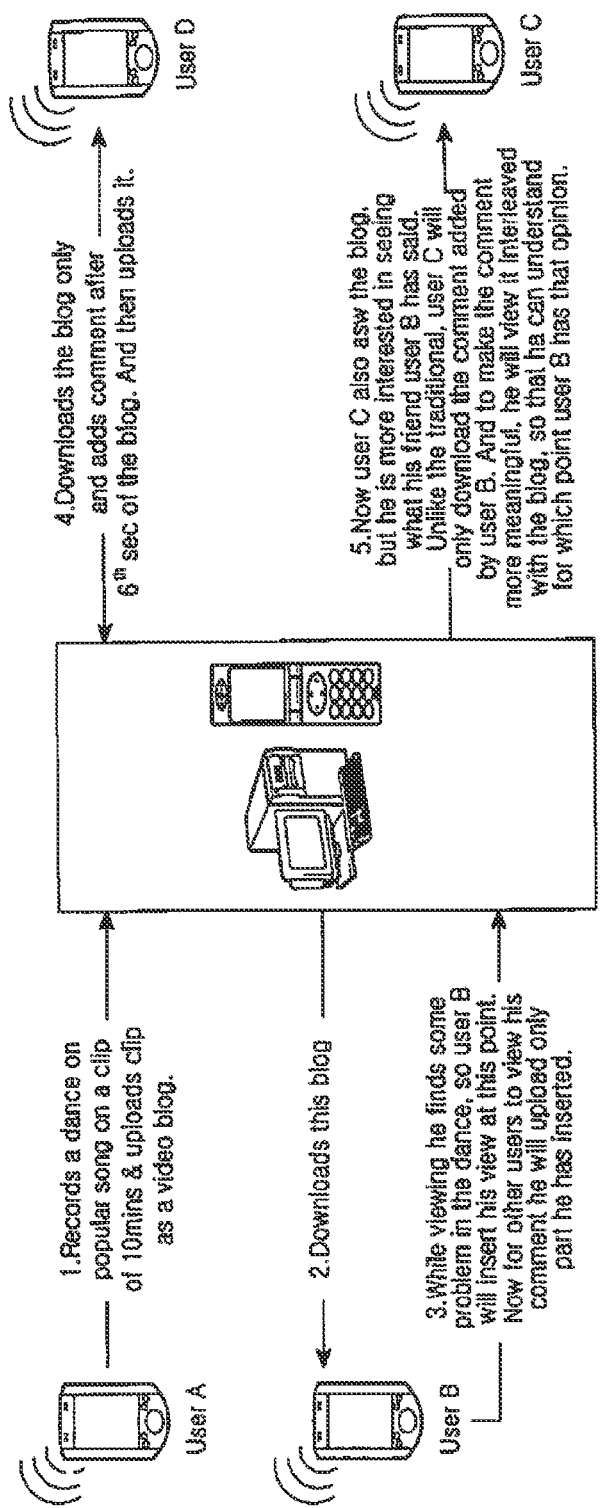
FIG. 3 is a diagram illustrating a method of viewing selected video blog comments according to an embodiment of the present invention.

Referring to FIG. 3, a method of viewing selected video blog comments is illustrated. The method further includes inserting or adding a user's comments at a specific portion of the blog.

The new I-VB approach allows a user to add information in the form of audio-video as a blog or add audio-video comments or a combination of text, audio, and video comments from a mobile/PC instantaneously.

The new approach to video blogging is easy, efficient, and allows a user to express the user's views interactively as the approach has methods to co-relate user comments and original content.

Entering text as a comment is difficult and cumbersome particularly if user is using handheld device like mobile phone. Entering text consumes lot of user time. It is difficult to associate a text comment with specific portion of a video blog. The new approach of video blogging allows a user to insert a comment in the form of audio video adds more value and meaning.

In the conventional method, the information or comments added by other users in a video blog are placed sequentially, and there is no mechanism currently available to co-relate user comments and a specific portion of the original video blog. With the new method a user can add the user's audio, video or text comment with respect to a specific point in the original video while watching the video.

In the conventional method, the original blog and comments added by other participants are inseparable. All comments are put placed sequentially and every comment or information added by any user becomes an integral part of the blog, which causes the blog to grow in size according to the number of participating users and the information added by each user. This problem is solved by the present invention, as each comment becomes a separate descriptor file and therefore, the original blog remains unchanged.

In the conventional method, a user must download/stream a complete blog every time whenever the user wants to watch or participate in the blog. The present invention enables a user to download the original blog and comments of the reader's choice.

In the current method, as video blogs' size grows according to the number of participating users and the content added by the users, a user who participates late feels a burden of uploading and downloading/streaming video blog. The conventional method overloads the server, the network, and consumes user time and money. This problem is prevented in the present invention, as the size of original blog remains same irrespective of the number of participating users and comments added by the users.

In the conventional method, a user cannot select specific comments of the user's interest made on a favorite video blog. The user must download/stream and watch a complete blog in order to see who has commented on the blog. The present invention proposes a method wherein user knows how many comments and who commented on the blog without downloading/streaming the blog.

In the conventional method, a user cannot select particular comments and directly watch/play the blog. In the present invention, the user can select and download a particular comment.

In the conventional method, there is no mechanism or method available that allows a user to insert a comment (text, audio, audio-video) on an original blog and upload only the comment. The user must upload the original blog, all previous comments, and new the comment inserted by the User. In the present invention, the user may download/stream only the original video blog, to insert his comment & needs to upload only comment.

In the conventional method there is no mechanism or method available that allows a user to insert comments (text, audio, audio-video) on an original blog instantaneously and upload only comments associated with specific portion, specific instant of the original video blog. The present invention allows user to insert a comment and co-relate to a specific point or portion of the original video blog.

In the conventional method there is no mechanism or method available that allows a user to see an original blog and comments (text, audio, audio-video) inserted, until now by various users separately (each comment is a separate entity). In the present invention, every comment can become a separate entity.

In the conventional method there is no mechanism or method available that allows user to see an original blog and all comments (text, audio, audio-video) on the original blog separately associated with specific portion, specific instant of the original video blog. The present invention allows the user to watch the original video blog and comments inserted by various users associated with a specific portion, or a specific instant of the original video blog.

In the conventional method there is no mechanism or method available that allows user to see an original blog and all comments (text, audio, audio-video) on the original blog, comment-to-comment (comments of one user associated with another user's comment) separately associated with a specific portion of the original blog, a specific instant of the original video blog or a comment of original video blog. The present invention enables a user to comment on a previously inserted comment.

A user may wish to insert a comment (text, audio, audio-video) at a specific time while watching an original blog and may want other users to see the user's inserted comment played at the same time while watching the video blog. The insertion of comments while watching blog by one user and playback the original blog along with inserted comments at the right time is not supported by current approach but is now possible with the new approach according to the present invention.

A user may wish to insert multiple comments in various forms (text, audio, audio-video) at different point of time while watching an original blog and may want other users to see the user's inserted comments played at the same time while watching the video blog. The insertion of a comment in various forms while watching blog by one user at various points of time and playback of the original blog along with inserted comments at the same time is not supported by conventional approaches, but is now possible with the new approach according to the present invention.

A user may have a video blog along with comments made by various users in various forms like text, audio, video. The user cannot select comments category-wise, like text, audio, audio-video, etc., which is possible with the new method proposed in the present invention.

A user may have a video blog along with comments made by various users in various forms like text, audio, video. The user cannot select a particular comment and play/watch the comment directly, which is possible with the method proposed in the present invention.

A user may have a video blog along with comments made by various users in various forms like text, audio, video. The user cannot select a particular comment and play/watch the comment directly along with the associated video or specific portion of the video, etc., which is possible with the method proposed in the present invention.

It will also be obvious to those skilled in the art that other control methods and apparatuses can be derived from the combinations of the various methods and apparatuses of the present invention as taught by the description and the accompanying drawings and these shall also be considered within the scope of the present invention. Further, description of such combinations and variations is therefore omitted above. It should also be noted that hosts for storing the applications include, but are not limited to a microchip, a microprocessor, a handheld communication device, a computer, a rendering device, or a multi-function device.

Although the present invention has been fully described in connection with the certain embodiments thereof with reference to the accompanying drawings, it is to be noted that various changes and modifications are possible and are apparent to those skilled in the art. Such changes and modifications are to be understood as included within the scope of the present invention as defined by the appended claims unless they depart there from.

What is claimed is:

1. A method for interactive video blogging, the method comprising the steps of:
   receiving, by a server, a comment attached to a video blog file from a first terminal, the comment being associated with a point of time at which the comment is displayed along with the video blog file;
   converting, by the server, the comment into a descriptor file;
   storing, by the server, the descriptor file;
   receiving, by the server, information on a selected one of a plurality of descriptor files stored in the server from a second terminal, the plurality of descriptor files representing a plurality of comments attached to the video blog file; and
   transmitting, by the server, the selected one of the plurality of descriptor files to the second terminal.

2. The method of claim 1, wherein each of the plurality of comments has a text form, an audio form, or an audio-video form.

3. The method of claim 1, wherein each of the plurality of descriptor files comprises a data area for storing a comment and a metadata area for defining the comment.

4. The method of claim 3, wherein the data area comprises at least one of a text comment, an audio comment, and a video comment created in a compressed or encoded form.

5. The method of claim 3, wherein the metadata area comprises a type of the comment.

6. The method of claim 5, wherein the metadata area further comprises a point of time at which the comment is displayed.

7. A server for interactive video blogging, the server comprising:
   a memory; and
   a controller that receives a comment attached to a video blog file from a first terminal, the comment being associated with a point of time at which the comment is displayed along with the video blog file, converts the comment into a descriptor file, stores the descriptor file in the memory, receives information on a selected one of a plurality of descriptor files stored in the memory from a second terminal, the plurality of descriptor files representing a plurality of comments attached to the video blog file, and transmits the selected one of the plurality of descriptor files to the second terminal.

8. The server of claim 7, wherein each of the plurality of comments has a text form, an audio form, or an audio-video form.

9. The server of claim 7, wherein each of the plurality of descriptor files comprises a data area for storing a comment and a metadata area for defining the comment.

10. The server of claim 9, wherein the data area comprises at least one of a text comment, an audio comment, and a video comment created in a compressed or encoded form.

11. The server of claim 9, wherein the metadata area comprises a type of the comment.

12. The server of claim 11, wherein the metadata area further comprises a point of time at which the comment is displayed.

13. A method for interactive video blogging, the method comprising the steps of:
   displaying, by a terminal, a video blog file;
   receiving, by the terminal, a comment attached to the video blog file from a user of the terminal, the comment being associated with a point of time at which the comment is displayed along with the video blog file;
   transmitting, by the terminal, the comment to a server;
   transmitting, by the terminal, information on a selected one of a plurality of descriptor files stored in the server to the server, the plurality of descriptor files representing a plurality of comments attached to the video blog file; and
   receiving, by the terminal, the selected one of the plurality of descriptor files from the server.

14. The method of claim 13, wherein each of the plurality of comments has a text form, an audio form, or an audio-video form.

15. The method of claim 13, wherein each of the plurality of descriptor files comprises a data area for storing a comment and a metadata area for defining the comment.

16. The method of claim 15, wherein the data area comprises at least one of a text comment, an audio comment, and a video comment created in a compressed or encoded form.

17. The method of claim 15, wherein the metadata area comprises a type of the comment.

18. The method of claim 17, wherein the metadata area further comprises a point of time at which the comment is displayed.

19. A terminal for interactive video blogging, the terminal comprising:
   a memory;
   a display that displays a video blog file; and
   a controller that receives a comment attached to the video blog file from a user of the terminal, the comment being associated with a point of time at which the comment is displayed along with the video blog file, transmits the comment to a server, transmits information on a selected one of a plurality of descriptor files stored in the server to the server, the plurality of descriptor files representing a plurality of comments attached to the video blog file, and receives the selected one of the plurality of descriptor files from the server.

20. The terminal of claim 19, wherein each of the plurality of comments has a text form, an audio form, or an audio-video form.

21. The terminal of claim 19, wherein each of the plurality of descriptor files comprises a data area for storing a comment and a metadata area for defining the comment.

22. The terminal of claim 21, wherein the data area comprises at least one of a text comment, an audio comment, and a video comment created in a compressed or encoded form.

23. The terminal of claim 21, wherein the metadata area comprises a type of the comment.

24. The terminal of claim 23, wherein the metadata area further comprises a point of time at which the comment is displayed.

* * * * *